June 23, 1942. W. A. SCHICK 2,287,199
AUTOMATIC STOPPING DEVICE FOR AUTOMOTIVE VEHICLES
Filed Aug. 28, 1941 2 Sheets-Sheet 1
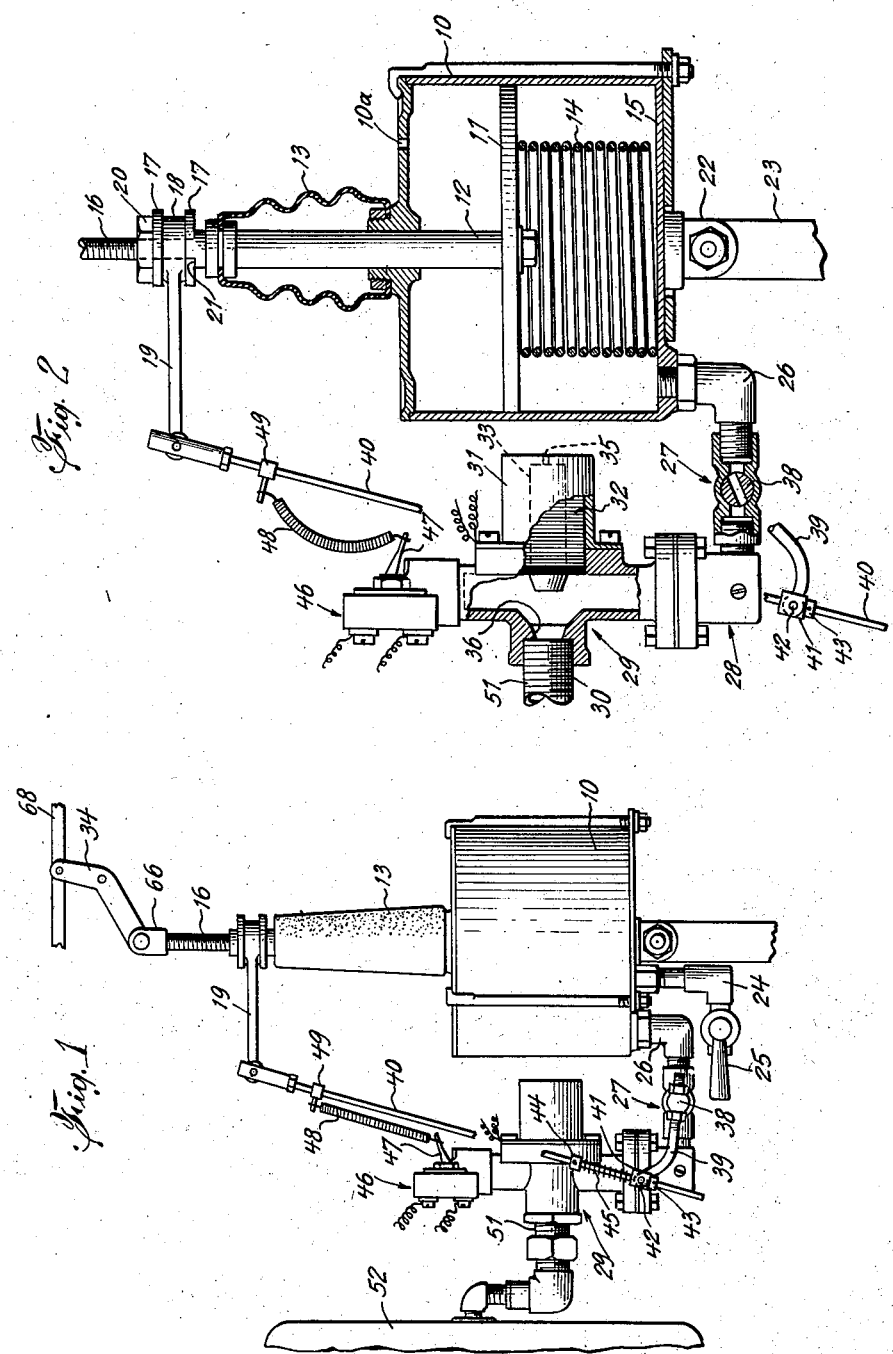
INVENTOR
WALTER A. SCHICK
BY F. Ledermann
ATTORNEY June 23, 1942.  W. A. SCHICK  2,287,199
AUTOMATIC STOPPING DEVICE FOR AUTOMOTIVE VEHICLES
Filed Aug. 28, 1941  2 Sheets-Sheet 2
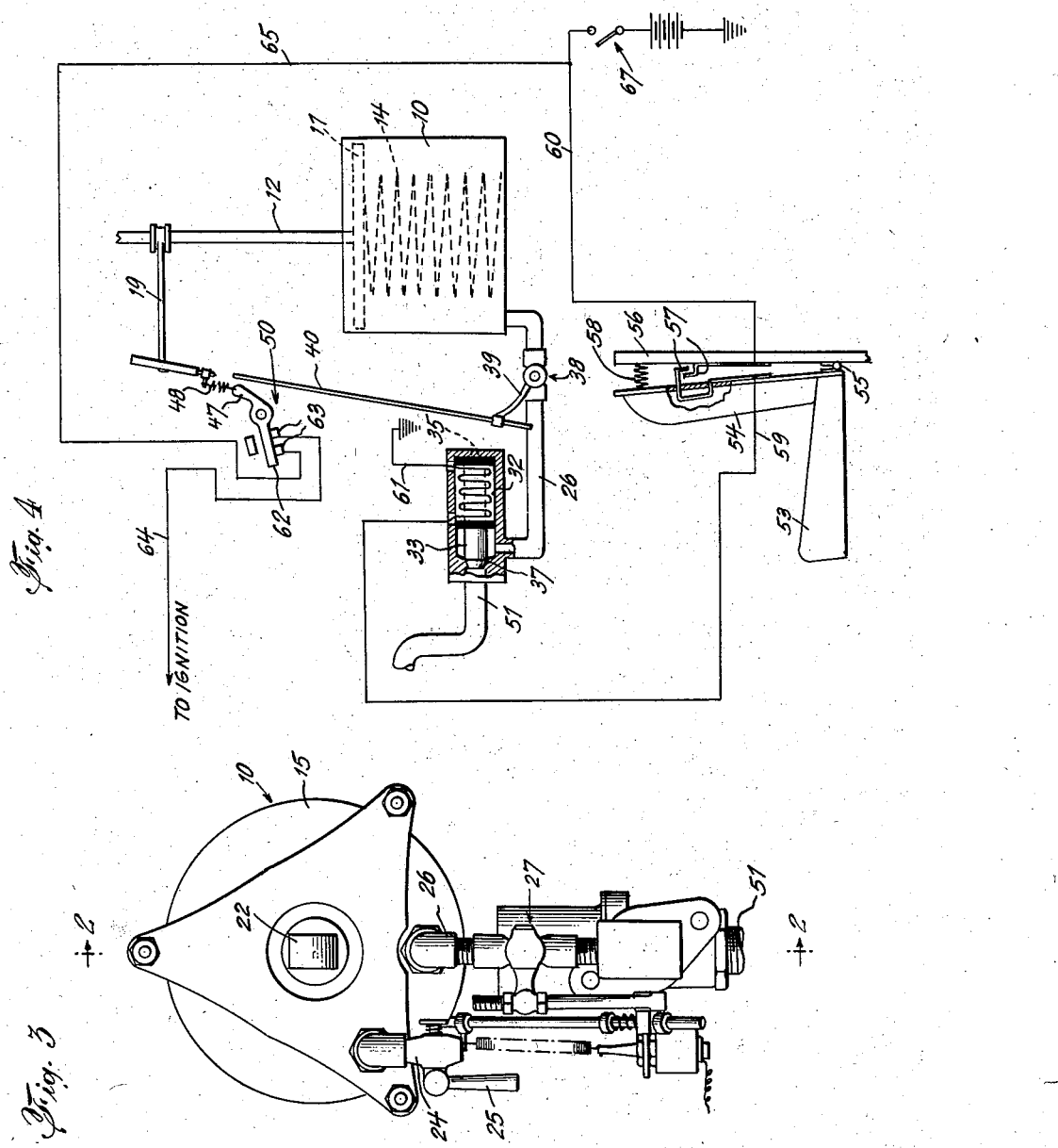
INVENTOR
WALTER A. SCHICK
BY J. Ledermann
ATTORNEY Patented June 23, 1942

2,287,199

UNITED STATES PATENT OFFICE 2,287,199

AUTOMATIC STOPPING DEVICE FOR AUTOMOTIVE VEHICLES

Walter A. Schick, Brooklyn, N. Y.

Application August 28, 1941, Serial No. 408,634

9 Claims. (Cl. 192—3)

This invention relates to devices for automatically bringing a motor vehicle to a stop when the driver loses control by virtue of becoming unconscious, falling asleep, or dying at the wheel, and aims to provide a novel device adapted simultaneously to cut off the ignition and to apply the brakes.

Another object of the invention is the provision of such a device with means for actuating the same to perform the above functions, the said means utilizing the vacuum from the intake manifold of the engine. The device may be mounted at any convenient position on the chassis.

The above and other objects will become apparent in the description below, wherein characters of reference refer to like-numbered parts in the accompanying drawings. It is not desired nor intended to limit the invention in any manner to the particular details of construction shown, excepting with the scope of the invention and the appended claims, since the drawings are presented for purposes of illustration only.

Referring briefly to the drawings, Figure 1 is a side elevational view of the device.

Figure 2 is a cross-sectional view taken on the line 2—2 of Figure 3, but showing the piston close to its lowermost position.

Figure 3 is a bottom plan view of the device.

Figure 4 is a partly schematic and partly fragmentary side elevational view of the device, with parts in section, and includes a wiring diagram and the electric circuit control by the back of the driver's seat.

Referring in detail to the drawings, the numeral 10 indicates a cylinder having the piston 11 slidable therein and the piston rod 12 extending therethrough. A bellows 13, of standard construction, encloses the piston rod and its opening through the cylinder top; a vent 10a is provided through the latter. A spring 14, positioned between the bottom wall 15 of the cylinder and the piston 11, normally urges the latter upward. The upper end 16 of the piston rod is reduced in diameter and threaded, and has a pair of spaced loose washers 17 thereon, between which lies the ring 18 rigid on the end of an arm 19. A nut 20 locks the ring 18 between the washers 17 and the lower washer 17 against the shoulder 21 of the piston rod. An eye 22 is rigid with the lower end of the cylinder 10, by means of which the device may be attached to a part 23 of the chassis or frame. An outlet pipe 24 extends from the bottom 15 of the cylinder 10 and has a normally closed petcock 25 in the end thereof.

A second pipe 26 extends from the bottom 15 of the cylinder and communicates through a valve 27 and a flange coupling 28 with the housing 29. The latter has a threaded opening 30 on one side and an auxiliary housing 31 directly opposite thereto, containing a solenoid 32 whose plunger 33 is freely slideable therein and is retracted upon energization of its coil. An air vent 35 extends through the end wall of the housing 31, for obvious reasons. A valve seat 36 is provided in the opening 30, and a valve head 37 formed on the plunger 33 is adapted to register in the seat 36 to close the passage 30.

The rotatable member 38 of the valve 27 has a deformed stem 39 secured thereto. A rod 40 is pivoted at its upper end to the arm 19. The sleeve 41 is pivoted at 42 on the end of the stem 39, and is slidably mounted on the rod 40. A collar 43 is adjustably secured by a set screw on the rod 40 below the sleeve 41, and a similar setscrew collar 44 is positioned at a distance above the collar 43. A coiled spring 45, on the rod 40 between the sleeve 41 and the collar 44, normally urges the sleeve 41 down against the collar 43. A housing 46, containing a toggle switch 50 which serves as an auxiliary ignition switch and is shown diagrammatically in Figure 4, is mounted above the housing 29 and has the handle 47 thereof joined by a tightly coiled spring 48 (which serves as a flexible delayed-action connecting link) to a collar 49 secured by a set screw near the upper end of the rod 40. With the piston 11 in the fully elevated position shown in Figures 1 and 4, the ignition switch 50 is in closed position.

The pipe 51, which is threaded into the opening 30 of the housing 29, is connected to the intake manifold 52 of the engine, whereby the suction thereof, with the engine running, may be applied to the device, as hereinafter set forth.

The driver's seat is shown in Figure 4, wherein the fixed seat bottom is shown at 53 and the movable back rest at 54; the latter may be hinged at 55 or made movable in any other desired manner. A rigid wall or frame 56 is just rearward of the movable back 54, and both the latter and the wall 56 have opposed contact members 57. A spring 58 normally urges the back rest 54 forward and the buttons 57 into mutual contact. A wire 59 leads from one contact 57 to one terminal of the solenoid 32, and a wire 60 leads from the other contact 57 through the master ignition switch 67 on the dashboard and the battery to ground. From the other terminal of the solenoid 32 a wire 61 leads to ground. The body portion 62 of the auxiliary ignition toggle switch 50 is adapted to swing into contact with the contacts 63 to close the circuit therethrough. From one of the contacts 63 a wire 64 leads to the ignition which is of course grounded. From the other contact 63 a wire 65 leads to the battery, through the master ignition switch 67.

Assuming that the device is in the condition shown in Figures 1 and 4, which is the condition when the driver's seat is occupied, then the valve 27 is fully open, the piston 11 lies at the top of the cylinder 10, (because of the spring 14) the piston rod 12 is fully raised, and the switch 50 is held in closed position by the spring 48; simultaneously, the circuit through the solenoid 32 is open and hence the plunger 33 lies free in the solenoid. By means of the yoke 66 on the upper end of the piston rod 12, the device may be connected to the brake-operating lever or rod 68 through a crank 34 so as to apply the brakes when the piston rod is in lowered position and to retract them when in elevated position, as will be hereinafter further discussed.

When the driver takes his seat, his back, pushing against the seat rest 56, will keep the contacts 57 apart. To operate the car, the driver closes the master ignition switch 67 on the dashboard and starts the engine. The suction coming from the manifold 52 immediately draws the loose plunger 33 to the left and seals valve 37 in seat 36, thus immediately shutting off further suction from reaching the cylinder 10. As long as the driver's back is against the seat rest 56, the valve 36—37 is thus kept closed by the manifold action. Should the driver slump forward as a result of sudden death or unconsciousness, the back rest 54 will be pushed forward by the spring 58 and the contacts 57—57 brought together, thus closing the circuit through the solenoid 32, whence the plunger 33 is retracted. This opens the valve 36—37 and permits the manifold suction to act upon the cylinder 10. The force of the suction causes descent of the piston 11 and with it the piston rod 12 and the rod 40. The latter, through the medium of the stem 39, gradually turns the valve 27 toward closed position. The various adjustable parts 49, 43, 44, on the rod 40 are so positioned at the outset, that at the same instant that the valve 27 has reached its fully closed position, the spring link will snap the toggle switch 50 (through the medium of its handle 47) to open position, thus simultaneously opening the ignition circuit and sealing the cylinder 10, with the partial vacuum therein maintaining the piston 11 in its lowered position. While the piston has thus been descending, the brake rod 68 has been gradually moved to apply the brakes (not shown). Thus the vehicle is quickly brought to a stop. In an actual application of the device on a vehicle, the time between opening of the seat switch 57—57 and opening of the ignition switch 50 consumed approximately five seconds. With the piston 11 thus held firmly in its lowered position, the brakes remain locked on the wheels. To release the piston for restoration of the device to its original inactive position, the petcock 25 is opened, whence atmospheric air enters the cylinder and permits the spring 14 to raise the piston to its normal position.

The utilization of the suction from the manifold, while the engine is running, to operate the device to cut off the ignition and to apply the brakes, insures a powerful force for the positive actuation of the device, and that force is ample for the purpose of simultaneously applying the brakes. Thus the device is of important practical application to prevent an automobile from running wild once the driver has lost control through unconsciousness or death, and the damage to persons and property following such an event is necessarily greatly reduced.

Obviously, modifications in form and structure may be made without departing from the spirit and scope of the invention.

I claim:

1. In combination with an internal combustion engine and the intake manifold thereof, a movable member, suction-operated means connected with said manifold for moving said member, a normally closed ignition switch, a normally closed valve in the passage connecting said manifold with said means, means for opening said valve to permit the suction from said manifold to move said member, and delayed action means between said switch and said member for opening said switch at a time interval after said member has begun to move.

2. In combination with an internal combustion engine and the intake manifold thereof, a movable member, suction operated means connected with said manifold for moving said member, a normally closed ignition switch, a normally closed valve in the passage connecting said manifold with said means, means for opening said valve to permit the suction from said manifold to move said member, and delayed action means between said switch and said member for opening said switch at a time interval after said member has begun to move, and brake-applying means connected to said member simultaneously actuated by said movement of said member.

3. A device comprising a cylinder having a piston slidable therein and a spring urging said piston toward one end of the cylinder, a housing having an inlet adapted to be connected to a source of suction, a solenoid in said housing having its plunger in axial alignment with said inlet and adapted to be drawn by said suction to close said inlet when said solenoid is deenergized, a pipe connecting said housing with said cylinder, a normally open valve in said pipe, the piston rod of said piston having a bracket thereon, a stem on said valve pivotally secured to said bracket, electrical means for energizing said solenoid, said plunger upon energization of said solenoid being withdrawn from said vent and permitting said suction to act upon said cylinder through said pipe, said suction in said cylinder drawing said piston toward the other end of the cylinder, and causing said piston rod to move said bracket and stem to move said valve to closed position, said valve when closed sealing said cylinder from said manifold suction with a partial vacuum therein and preventing said piston from returning to its original position, said bracket being adapted to be connected with an ignition switch to open the same when said valve reaches said closed position.

4. In combination with an internal combustion engine including the intake manifold and the ignition switch thereof, a movable member adapted to be moved longitudinally from a normal position of rest over a distance therefrom, suction-operated means connected with said manifold for moving said member, said switch being normally closed, a valve in the passage connecting said manifold with said means, said valve being normally maintained in closed position by the suction from said manifold, means for opening said valve to permit said suction to move said member, and means connecting said switch to said member for opening said switch when said member has been moved to the end of said distance.

5. In combination with an internal combustion engine including the intake manifold and the ignition switch thereof, a movable member adapted to be moved longitudinally from a normal position of rest over a distance therefrom, suction-operated means connected with said manifold for moving said member, said switch being normally closed, a valve in the passage connecting said manifold with said means, said valve being normally maintained in closed position by the suction from said manifold, means for opening said valve to permit said suction to move said member, and means connecting said switch to said member for opening said switch when said member has been moved to the end of said distance, and additional normally open valve means in said passage, a link connecting said member with said additional valve means for simultaneously closing the latter when said member has reached the end of said distance as aforesaid, said additional valve means in said closed position sealing said first-named means and maintaining said member in said last-named position.

6. A device comprising a movable member adapted to be moved through a given distance of travel, suction-operated means adapted to move said member and to be connected with a source of suction and having a valve thereon at the point of connection to said source, said valve when so connected being normally closed by said suction, means for opening said valve when so connected to permit said suction to operate said first-named means to move said member to the end of said travel, a normally open valve positioned between said first-named means and said first-named valve and connected with said member, said member moving said second to closed position at said end of said travel to seal said first-named means from said suction and for thereby maintaining said member in its said last-named position.

7. A device comprising a movable member adapted to be moved through a given distance of travel, suction-operated means adapted to move said member and to be connected with a source of suction and having a valve thereon at the point of connection to said source, said valve when so connected being normally closed by said suction, means for opening said valve when so connected to permit said suction to operate said first-named means to move said member to the end of said travel, an internal combustion engine having said source in the intake manifold thereof, an ignition switch in the ignition circuit of said engine, and means connecting said member with said switch for opening said switch and stopping said engine when said member reaches said end of its travel.

8. A device comprising a movable member adapted to be moved through a given distance of travel, suction-operated means adapted to move said member and to be connected with a source of suction and having a valve thereon at the point of connection to said source, said valve when so connected being normally closed by said suction, means for opening said valve when so connected to permit said suction to operate said first-named means to move said member to the end of said travel, a normally open valve positioned between said first-named means and said first-named valve and connected with said member, said member moving said second to closed position at said end of said travel to seal said first-named means from said suction and for thereby maintaining said member in its said last-named position, an internal combustion engine having said source in the intake manifold thereof, an ignition switch in the ignition circuit of said engine, and means connecting said member with said switch for opening said switch and stopping said engine when said member reaches said end of its travel.

9. A device comprising a cylinder having a piston therein and provided with means normally urging said piston toward one end of the cylinder, a housing having an inlet adapted to be connected with the intake manifold of an internal combustion engine and an outlet having a pipe leading therefrom, said pipe being connected to said cylinder and having a normally open valve therein, a solenoid in said housing having the plunger thereof adapted to register in said inlet to close the same when so connected and to shut off said suction from said housing, the piston rod of said piston having a bracket thereon, a normally open valve in said pipe, said valve having a stem pivotally connected with said bracket, means for energizing said solenoid to retract said plunger out of said inlet to permit said suction to act upon said cylinder and thereby to draw said piston to the other end thereof, said bracket being moved by said piston to shut off said valve to seal said cylinder and to maintain said piston in said last-named position, said bracket being adapted to be connected to the ignition switch of said engine to open the same when said piston rod reaches said last-named position.

WALTER A. SCHICK.